(12) United States Patent
Stawikowski (10) Patent No.: US 7,159,007 B2
(45) Date of Patent: *Jan. 2, 2007

(54) COMMUNICATION SYSTEM FOR AUTOMATION EQUIPMENT BASED ON THE WSDL LANGUAGE

(75) Inventor: Jean-Marie Stawikowski, Antibes (FR)

(73) Assignee: Schneider Automation, Valbonne (FR)

( * ) Notice: Subject to any disclaimer, the term of this patent is extended or adjusted under 35 U.S.C. 154(b) by 653 days.

This patent is subject to a terminal disclaimer.

(21) Appl. No.: 09/940,573

(22) Filed: Aug. 29, 2001

(65) Prior Publication Data

US 2002/0174178 A1    Nov. 21, 2002

(30) Foreign Application Priority Data

Aug. 31, 2000  (FR)  ................................... 00 11320

(51) Int. Cl.
*G06F 15/16*  (2006.01)
(52) U.S. Cl. ...................... 709/202; 709/218; 709/220; 709/223; 700/95; 700/275
(58) Field of Classification Search ................ 707/513; 709/230, 227, 201–203, 218, 220, 223; 700/95, 700/275

See application file for complete search history.

(56) References Cited

U.S. PATENT DOCUMENTS

| | | | |
|---|---|---|---|
| 6,457,066 B1* | 9/2002 | Mein et al. | 719/330 |
| 6,591,260 B1* | 7/2003 | Schwarzhoff et al. | 707/2 |
| 6,675,070 B1* | 1/2004 | Lapham | 700/245 |
| 6,694,371 B1* | 2/2004 | Sanai | 709/230 |
| 6,725,104 B1* | 4/2004 | Lo et al. | 700/65 |
| 6,792,466 B1* | 9/2004 | Saulpaugh et al. | 709/229 |
| 6,801,813 B1* | 10/2004 | Kay et al. | 700/86 |
| 6,915,330 B1* | 7/2005 | Hardy et al. | 709/203 |
| 6,961,633 B1* | 11/2005 | Marbach et al. | 700/97 |
| 7,080,137 B1* | 7/2006 | Brault | 709/224 |
| 7,085,814 B1* | 8/2006 | Gandhi et al. | 709/208 |
| 2002/0032790 A1* | 3/2002 | Linderman | 709/230 |
| 2002/0069222 A1* | 6/2002 | McNeely | 707/513 |

OTHER PUBLICATIONS

Pending U.S. Appl. No. 09/940,462, filed Aug. 29, 2001.
Pending U.S. Appl. No. 09/940,573, filed Aug. 29, 2001.

* cited by examiner

*Primary Examiner*—Bunjob Jaroenchonwanit
*Assistant Examiner*—Victor Lesniewski
(74) *Attorney, Agent, or Firm*—Oblon, Spivak, McClelland, Maier & Neustadt, P.C.

(57) ABSTRACT

Communication system on an IP network between automation equipment capable of executing at least one program to provide automation functions and one or more remote items of equipment executing one or several computer applications. The communication system conforms with the WSDL (Web Services Description Language) language and provides monitoring, display, control, configuration or programming functions of the automation equipment to remote equipment. The communication system uses at least one service description document that conforms with the WSDL language accessible through a URL address and that describes capabilities of one or several WEB services capable of interacting with a program on the automation equipment.

31 Claims, 7 Drawing Sheets

COMMUNICATION SYSTEM FOR AUTOMATION EQUIPMENT BASED ON THE WSDL LANGUAGE

CROSS-REFERENCE TO RELATED APPLICATIONS

This application claims priority to French Patent Application number 00 11320, filed Aug. 31, 2000.

BACKGROUND OF THE INVENTION

1. Field of the Invention

This invention relates to a communication system and a process for communication on a global Internet, Intranet or Extranet type network between at least one item of automation equipment offering one or several automation functions in an automation application and at least one item of remote equipment. The communication system uses the WSDL (Web Services Description Language), using at least one WEB service conform with the WSDL language and capable of interacting with a program in the automation equipment. This type of communication system may be applicable to any automation application particularly industrial logic controllers, building automation equipment, or instrumentation/control for electrical distribution networks.

2. Discussion of the Background

The term "automation equipment" used below refers to a programmable logic controller, a numeric control, an instrumentation/control station or any equipment or automation module with at least one processing unit capable of connecting to an IP (Internet Protocol) network as defined in the following section, and capable of executing a program to offer one or several automation functions in an automation application. This definition will thus include an application specific module or an inputs/outputs module of a programmable logic controller, a dialog terminal, a speed variator, etc.

It is known that this type of automation equipment may include a WEB server to be able to exchange data related to the automation equipment with a remote WEB client, such as a browser connected to a global communication network. This global network may be of the Internet, Intranet or Extranet type conform with the TCP/IP standard or the UDP/IP standard and will be called "IP network" throughout the rest of the presentation. In particular, these functions are described in documents WO9913418, U.S. Pat. No. 6,061,603, and U.S. Pat. No. 5,805,442. Data related to the automation equipment are then formatted and sent by the WEB server, for example in the HTML or XML (extended Markup Language) pages. It is also possible that a WEB server installed in automation equipment could load a program, usually called an Applet, in remote equipment, and the said program is executed in the remote equipment to exchange requests transported by the IP protocol, with the WEB server in the automation equipment.

SUMMARY OF THE INVENTION

In the following, the term "remote equipment" may denote a personal computer, a portable telephone, or a PDA (Personal Digital Assistant) type equipment, or a computer server such as an ASP (Applications Service Provider), an applications server (J2EE, NET, etc.), a WEB server, a WAP server, a database management system (DBMS) server, an integrated management software (PGI) server, an ERP (Enterprise Resource Planning) server, an EAI (Enterprise Application Integration) server, an electronic document management (EDM) server, a business to business electronic shopping (B-to-B) server, a station for programming automation equipment, or any other computer system. Remote equipment may also be used to refer to a set of remote items of equipment communicating with each other. The remote equipment comprises at least one processing unit, is capable of connecting to at least one item of automation equipment through an IP network and executing a program or a set of computer programs. Some automation equipment such as dialog terminals may also be considered as remote equipment.

In the rest of this description, the term "intermediate equipment" refers to remote equipment connected to one or several remote items of equipment and to one or several items of automation equipment. The function of the intermediate equipment is to act as proxy for the automation equipment. It is also capable of receiving and sending requests encoded according to specific protocols on the IP network to automation equipment and it can interact with an automation equipment program. Some intermediate equipment such as network communication modules or network communication equipment may also be considered as being automation equipment.

The WSDL (Web Services Description Language) language is a language that can be used to make a simple description of WEB services in a distributed and decentralized environment. A WEB service is a modular application based on Internet that executes precise tasks and that respects a specific format. The WSDL language is based on the XML (eXtensible Markup Language) and may be used in combination with several other WEB protocols such as SOAP (Simple Object Access Protocol), HTTP (Hyper Text Transfer Protocol), HTTPS (Hyper Text Transfer Protocol/ Secure Socket Layer), MIME (Multipurpose Internet Mail Extensions). SMTP (Simple Mail Transfer Protocol), FTP (File Transfer Protocol), or the IP (Internet Protocol) protocol. The WSDL language is based on XML schemes and provides a vocabulary defining a structure, contents and a communication description syntax. This language is deposited with the W3C (World Wide Web Consortium) and at the moment is described in a WSDL note 1.1 published on Mar. 15, 2001.

The term "WSDL binding" specifies particular information related to the protocol and the data format for an abstract entity, such as a message or operation defined for a particular "PortType". A WSDL binding refers to the process associating information about the protocol and the data format with an abstract entity. A "PortType" is a named series of abstract operations in which each operation refers to an input message and to output messages, a message representing an abstract definition of a transmitted data type (for example string, boolean, etc. . . . ). A WSDL binding is conform with the WSDL language and is based on the XML language.

The WSDL language enables extension elements representing a specific binding in a given technology. Thus, a WSDL binding is defined as being an extension of the WSDL language for supported protocols described in the WSDL specification document, namely SOAP, HTTP GET/ POST or MIME. It also accepts other extensions of the WSDL language for protocols not specific to the WSDL language and particularly for protocols used in automation equipment, for example such as PROFInet, EtherNet/IP, MODBUS/TCP protocols, etc.

It would be particularly useful for the designer of a computer application in remote equipment using development tools that are increasingly widespread on the market, or for a user of any computer application, for example such as a browser, a JAVA servlet, a Java Server Pages (JSP) application, an Active Server Pages (ASP) application, etc., running on an applications server or on a WEB server, to be able to make direct exchanges of data on an IP network with one or several items of automation equipment using the WSDL language. By adapting the automation equipment to WEB service description languages derived from the computer world, an automation equipment would thus be able to communicate with a remote computer application developed separately with development tools in the computer world, through WEB services, thus opening up automation applications to the Internet field. The WSDL language facilitates distribution of applications in the form of WEB services, particularly because the WSDL language offers an XML syntax that is capable of giving a WEB services description format.

The WSDL language is one of the bricks used to design WEB applications, independently of the platform, the object model and the programming language used. This element is essential to set up a direct dialog between applications. With the WSDL language, there is a major advantage in being able to access automation equipment using WEB services in the form of a programmable interface conform with the WSDL language, in that the designer of any computer application can thus use these WEB services to be able to exchange information with automation equipment without being concerned with the need to design a specific user interface. Furthermore, due to the use of a service description document, he is in a position to know the WEB services that a given automation equipment is capable of providing at all times.

Thus, the WSDL language may be seen as being a complement to the SOAP protocol since it facilitates interoperability of WEB services. Access to automation equipment becomes standard with the SOAP protocol as the message structuring language and with the WSDL language to describe WEB services. With the WSDL language, applications that use the SOAP protocol are capable of automating exchanges between WEB services, while concealing most low level technical details. Furthermore, the WSDL language may also be seen as being the complement of Universal Description, Discovery and Integration (UDDI), the universal directory that stores document references describing the capabilities of WEB services.

In order to achieve this, the invention describes a communication system on an IP network between automation equipment with at least one processing unit capable of executing at least one program to provide automation functions and one or more remote items of equipment executing one or several computer applications. The communication system is conform with the WSDL (Web Services Description Language) language in order to provide automation equipment monitoring, display, control, configuration or programming functions to the remote equipment, and the communication system uses at least one service description document conform with the WSDL language that describes capabilities of one or several WEB services capable of interacting with an automation equipment program. A service description document is accessible for remote equipment using a URL, URI or IP address, through an IP network interface.

According to one characteristic, a WEB service is capable of receiving and sending messages encoded according to at least one communication protocol conform with at least one WSDL binding described in a service description document, on the IP network.

According to one special feature, at least one WSDL binding described in a service description document is conform with the SOAP, HTTP or the MIME protocol. According to another feature, at least one WSDL binding described in a service description document is conform with a protocol specific to the automation equipment.

According to another characteristic, the communication system comprises a service description document generator capable of dynamically building a service description document related to an automation equipment when requested by a remote equipment, and accessible to remote equipment through a URL, URI or IP address or through an IP network interface.

The invention also relates to a communication process used in such a communication system and comprising the following steps:

a first WEB service discovery step in which a computer application or a development application executing on a remote equipment sends a request on the IP network to receive one or several service description documents in a reply conform with the WSDL language and describing the capabilities of one or several WEB services, a second generation step in which a service description document conform with the WSDL language is used to generate all or part of a computer application by means of code generators or to generate a behaviour in a computer application by means of WSDL document interpreters, such that the computer application on remote equipment communicates with a WEB service through messages conform with the communication protocol described in the service description document, a third communication step on the IP network between a computer application executed on remote equipment and at least one automation equipment WEB service, by means of messages conform with the communication protocol described in the service description document.

BRIEF DESCRIPTION OF THE DRAWINGS

Other characteristics and advantages will become clear in the detailed description given below with reference to an embodiment given as an example and represented by the attached drawings in which.

DESCRIPTION OF THE PREFERRED EMBODIMENTS

Figure 1:
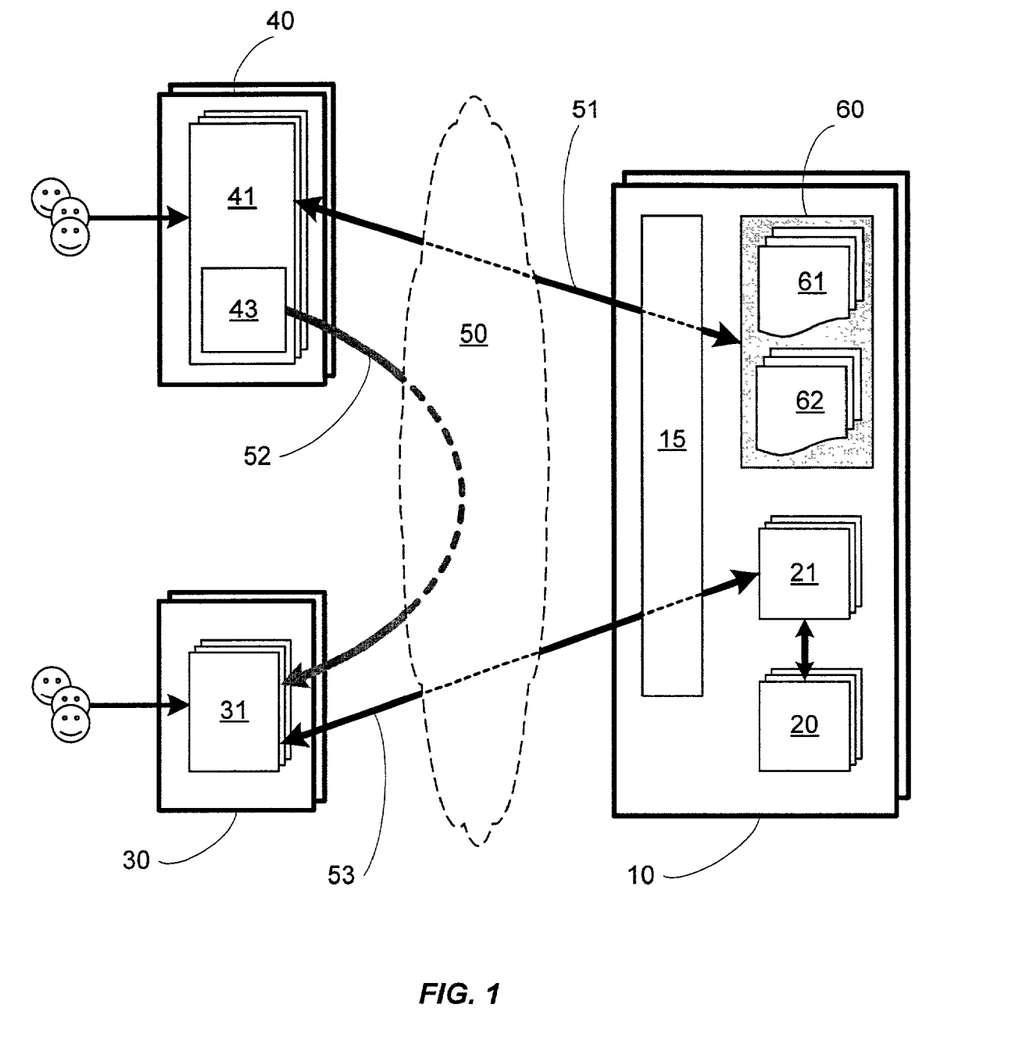
FIG. 1 represents a first example of a communication system conform with the invention between automation equipment comprising a WEB service and a first remote equipment executing a computer application, which is partially or entirely generated by means of a development application executed in second remote equipment.

With reference to FIG. 1, automation equipment 10 is connected through an IP network 50 to first remote equipment 30. The automation equipment 10 comprises at least one processing unit (not shown) capable of executing at least one program 20 offering one or several automation functions to an automation application. For example, this program 20 may be an application program (or a user program) for the instrumentation/control of an automation application, or it may also be the operating system installed in the automation equipment 10 directly. The automation equipment 10 comprises at least one WEB service 21 capable of interacting with the said program 20. In order to communicate on the IP network 50, the automation equipment 10 comprises an HTTP, HTTPS, SMTP, FTP, TCP, UDP or IP type network interface 15.

A WEB service is a resource accessible on an IP network through an IP network interface 15, 15', 15". According to the invention, a WEB service can receive and send messages 53 encoded according to a communication protocol conform with the WSDL binding described in a service description document 61, on the IP network 50. A WEB service is capable of interacting with a program 20 in automation equipment 10. This resource is formally described by a software interface contained in a service description document 61. An implementation of such a software interface is also called "WEB service" in this presentation.

The communication system described in this invention uses a service description document 61 that describes the capabilities of one or several WEB services 21, 21' on automation equipment 10, in other words that describes the WEB services that automation equipment 10 is capable of supplying or offering. The service description document 61 is accessible through a remote equipment 30, 40, either from its local resources or from remote resources identified by a Uniform Resource Locator (URL), Universal Resource Identifier (URI) or Internet Protocol (IP) address, through an IP network interface 15, 15', 15". Thus, due to this type of document 61, any remote equipment 30, 40 is able to know what services are available about an automation equipment 10 at all times. A service description document 61 may also contain a description of several standard WEB services 21, 21', for example corresponding to services systematically installed in a well-identified complete range of automation equipment. Similarly, it may also describe a particular WEB service 21, 21' available on a complete list of distinct automation equipment.

A service description document 61 is a document that is conform with the WSDL language and that describes the capabilities of a WEB service. According to one characteristic of the invention, the service description document 61 describes at least one WSDL binding that is conform with one of the protocols supported by the WSDL language, such as SOAP, HTTP or MIME. According to another characteristic, the service description document 61 describes at least one WSDL binding that is conform with one of the protocols specific to automation equipment, particularly such as PROFInet, EtherNet/IP or MODBUS/TCP.

A service description document 61 specifies a set of requests (request name, nature and name of parameters, request attributes) and the protocol(s) to be used to invoke the request to the automation equipment 10, for each service. If applicable, this or these protocols may be understood. The service description document 61 is conform with a service description language referring to the SOAP protocol or to the HTTP or HTTPS protocol and providing grammar based on the XML language or XML diagrams defined by the W3C.

A WEB service 21 may also be described by several service description documents 61 each conform with a different service description language such that the same automation equipment 10 may be accessible to different computer applications. Furthermore, a service description document 61 may be compressed in a standard file or document compressed format such as ZIP or GZIP.

With reference to FIG. 1, the first remote equipment 30 comprises a processing unit (not shown) capable of executing at least one arbitrary computer application 31, for example such as a browser, a JAVA servlet, a JSP application, an ASP application, etc. All or some of this computer application 31 is generated and deployed 52 by means of a development application 41, for example such as a development tool, that is executed by a processing unit in a second remote equipment 40.

For this purpose, the development application 41 comprises a code generator 43. This code generator 43 reads the WSDL document and automatically generates interfaces and code in the programming language used that correspond to operations defined in the WSDL document. The code generator 43 uses at least one WSDL binding conform with at least one of the protocols supported by the WSDL language, such as SOAP, HTTP or MIME. In the example in FIG. 1, the development application 41 uses a service description document 61 located in the automation equipment 10 to generate some or all of the computer applications 31.

Figure 2:
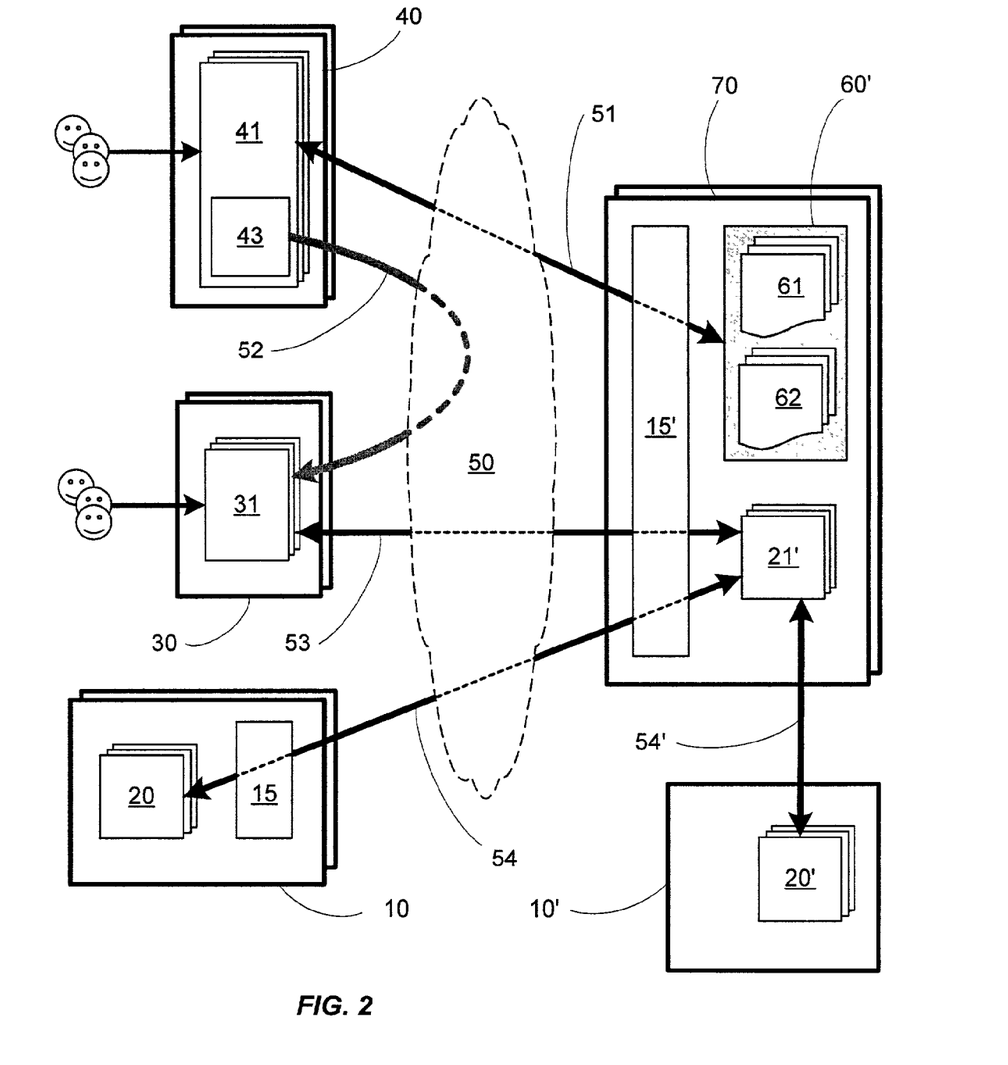
FIG. 2 is similar to FIG. 1 except that the WEB service is located in intermediate equipment.

FIG. 2 diagrammatically shows a variant of FIG. 1 in which an intermediate equipment 70 is introduced and connected to the remote equipment 30, 40 and the automation equipment 10 through a network interface 15'. The intermediate equipment 70, that may be a computer server, memorizes at least one service description document 61 and a WEB service 21' related to the automation equipment 10 and behaves like a Proxy that is a representative of the automation equipment 10. With this type of Proxy, remote equipment appears to be connected to the genuine automation equipment 10 although it is actually only connected to the proxy of the automation equipment 10. The WEB service 21' of the intermediate equipment 70 is capable of receiving and sending requests 54 encoded according to one or several protocols specific to the automation equipment, for example such as the PROFInet, EtherNet/IP, MODBUS/TCP, etc. protocols, on the IP network 50, to interact with at least one program 20 in automation equipment 10. According to one variant of the invention, the WEB service 21' of the intermediate equipment 70 is also capable of receiving and sending requests 54' encoded according to different protocols specific to the automation equipment, for example such as MODBUS, Uni-TE, AS-I, etc. protocols, without using an IP network, in order to interact with at least one program 20' in automation equipment 10'.

Figure 3:
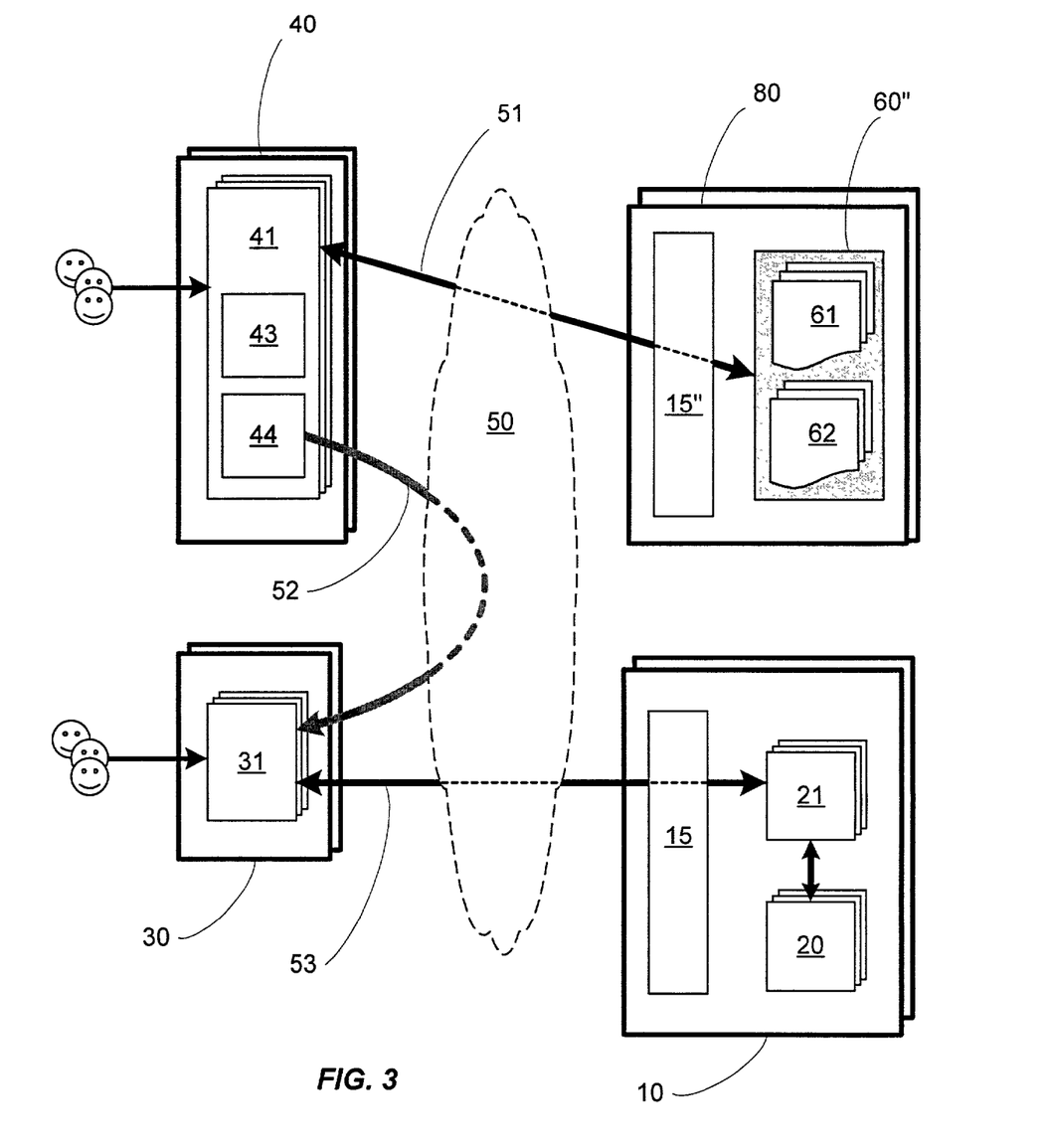
FIG. 3 shows a variant to the communication process in FIG. 1 in which the service description document is memorized in a server.

FIG. 3 shows another variant of the communication process in FIG. 1 according to which the automation equipment 10 installs a WEB service 21 but not a service description document 61. The service description document(s) 61 is (are) memorized in storage means 60" on a server 80. This server 80, that may be a file server or another server, is capable of communicating on the IP network 50 with remote equipment 30, 40 through a network interface 15", to supply the remote equipment with a service description document 61.

Thus, one of the advantages of this invention is also the fact that a service description document 61 describing the WEB services of automation equipment 10 may be built in different ways. It may be memorized either in storage means 60 located in the automation equipment 10 (FIG. 1), or in storage means 60' of an intermediate equipment 70 connected both to the automation equipment 10 and to the remote equipment 30, 40 (FIG. 2) or in local storage means (hard disk, CD-ROM, DVD or others) on remote equipment 40 communicating with the automation equipment 10, or remote storage means 60" in a server 80 accessible from the remote equipment 40 (FIG. 3) through an URL, URI or IP address through the IP network 50.

These variants are attractive due to the limited amount of memory available in most automation equipment 10. Automation equipment 10 does not necessarily have sufficient memory to internally store one or several service description documents 61, consequently it is useful to be able to store this or these documents in intermediate equipment or in an external server. It is also advantageous when several items of automation equipment on the same site have similar WEB services that can be described by the same service description document stored in a unique location. Furthermore, this or these service description document(s) 61 is (are) sometimes only available for users on CD-ROM type or other media.

Furthermore, FIG. 3 also shows the use of a code generator 44 specific to automation equipment, instead of the code generator 43, thus extending the capabilities of the development application 41 for protocols that are specific to automation equipment. The code generator 44 specific to automation equipment may be installed in the form of a complementary or "plug-in" module. It reads the WSDL document and automatically generates interfaces and code in the programming language used that corresponds to operations defined in the WSDL document. The code generator 44 uses at least one WSDL binding conform with at least one protocol specific to the automation equipment.

Furthermore, it would be possible to envisage that at least one WSDL binding described in a service description document 61 would be conform with at least one version of the SOAP protocol encoded in a binary format. In this type of encoded version of the SOAP protocol, a number of predetermined binary codes would systematically replace longer text expressions that are used in the SOAP protocol, particularly for frequently used text expressions. This encoded version would then have the advantage that it uses fewer characters to describe a WEB service and would therefore be more economic in memory size, which is an important argument for automation equipment with limited memory space.

Figure 4:
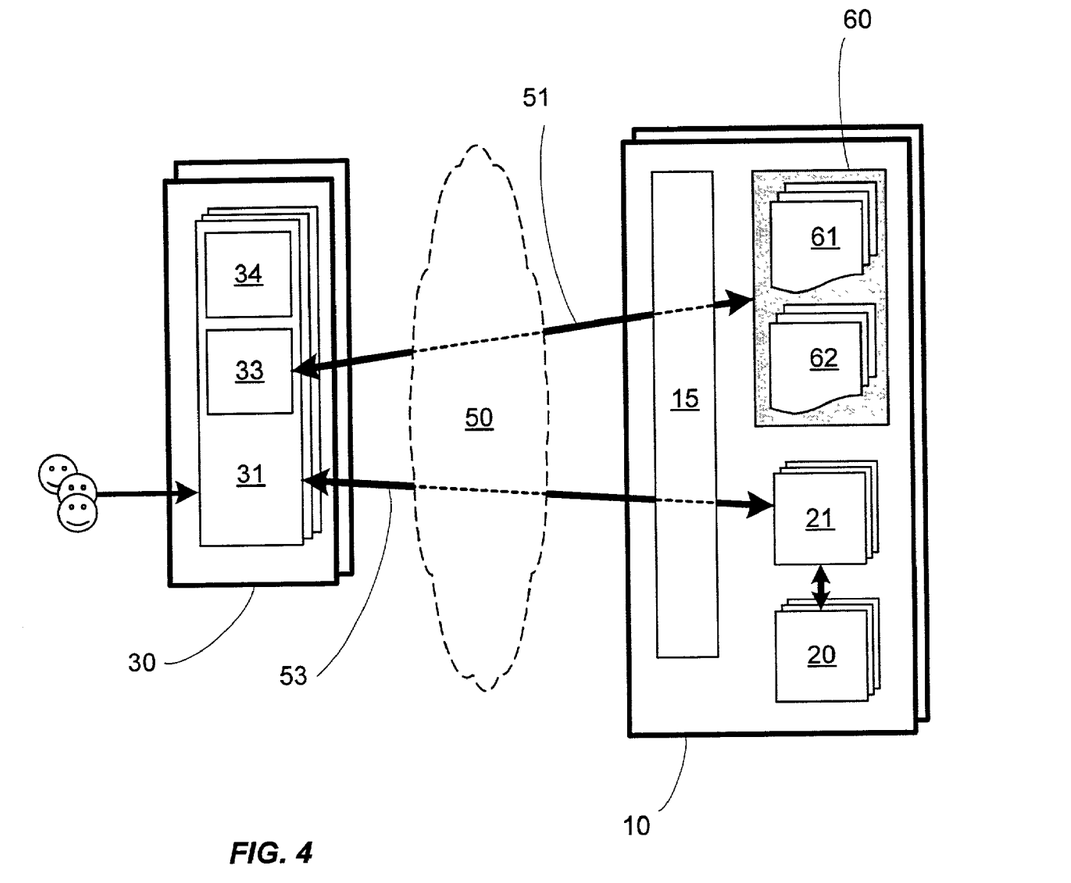
FIG. 4 represents a second example of a communication system conform with the invention between automation equipment comprising a WEB service and remote equipment executing a computer application that comprises a WSDL document interpreter.

In FIG. 4, a second example shows a system for communication between automation equipment 10 comprising a WEB service 21 and a remote equipment 30 comprising a computer application 31, that uses the service description document 61 located in the automation equipment 10. Unlike the example in FIG. 1, the computer application 31 comprises a WSDL document interpreter 33. This WSDL document interpreter 33 reads the WSDL document by means of a read request 51 and will automatically generate a behaviour in the computer application 31, such as a man-machine interface (MMI) that corresponds to the operations defined in the WSDL document. The interpreter 33 uses at least one WSDL binding conform with at least one of the protocols supported by the WSDL language such as SOAP, HTTP or MIME.

The computer application 31 may also comprise a WSDL document interpreter 34 specific to the automation equipment installed in the form of a complementary module "plug-in", in an equivalent manner, to extend the capabilities of the computer application 31. This WSDL document interpreter 34 is capable of reading the WSDL document by means of a read request 51 and automatically generating a behaviour in the computer application 31 such that a man-machine interface (MMI) that corresponds to the operations defined in the WSDL document. The WSDL document interpreter specific to automation equipment 34 uses at least one WSDL binding conform with at least one protocol specific to automation equipment.

Figure 5:
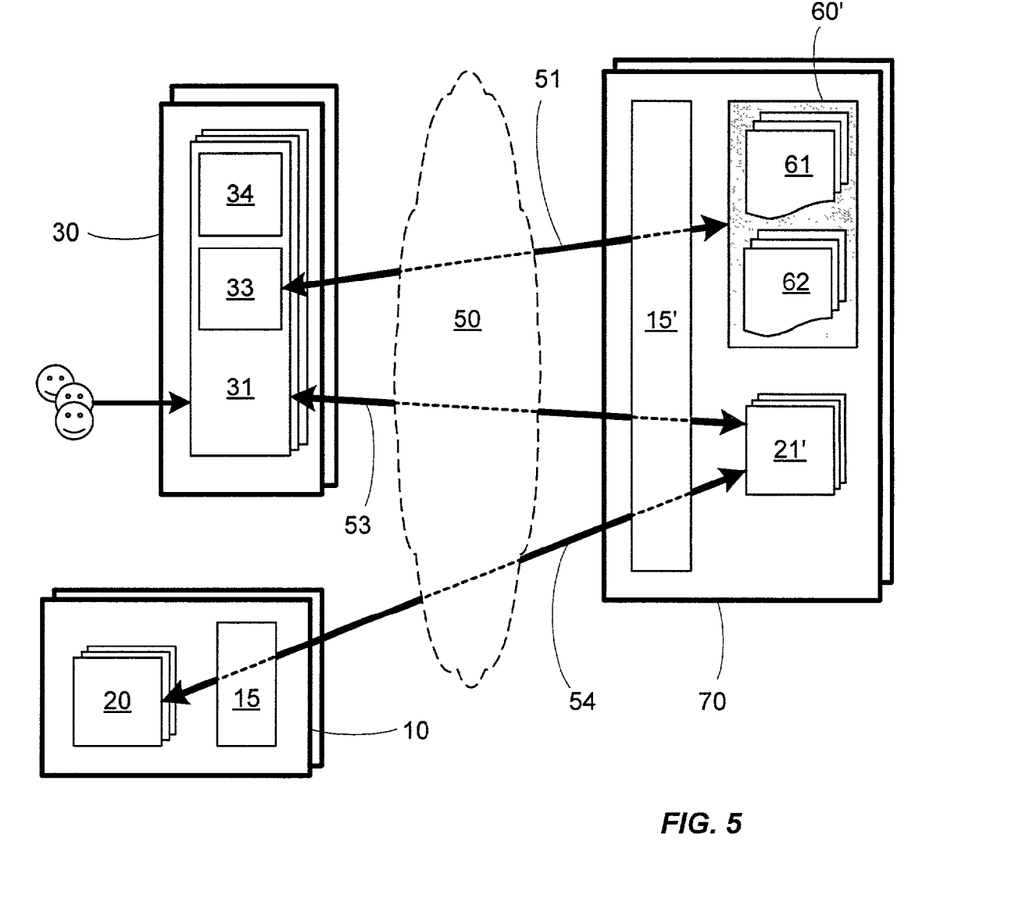
FIG. 5 is similar to FIG. 4 with a WEB service installed in intermediate equipment.

FIG. 5 uses the variant in FIG. 2 adapted to the example in FIG. 4. An intermediate equipment 70 connected to the remote equipment 30, 40 and to the automation equipment 10 through a network interface 15', memorizes at least one service description document 61 and a WEB service 21' related to the automation equipment 10.

Figure 6:
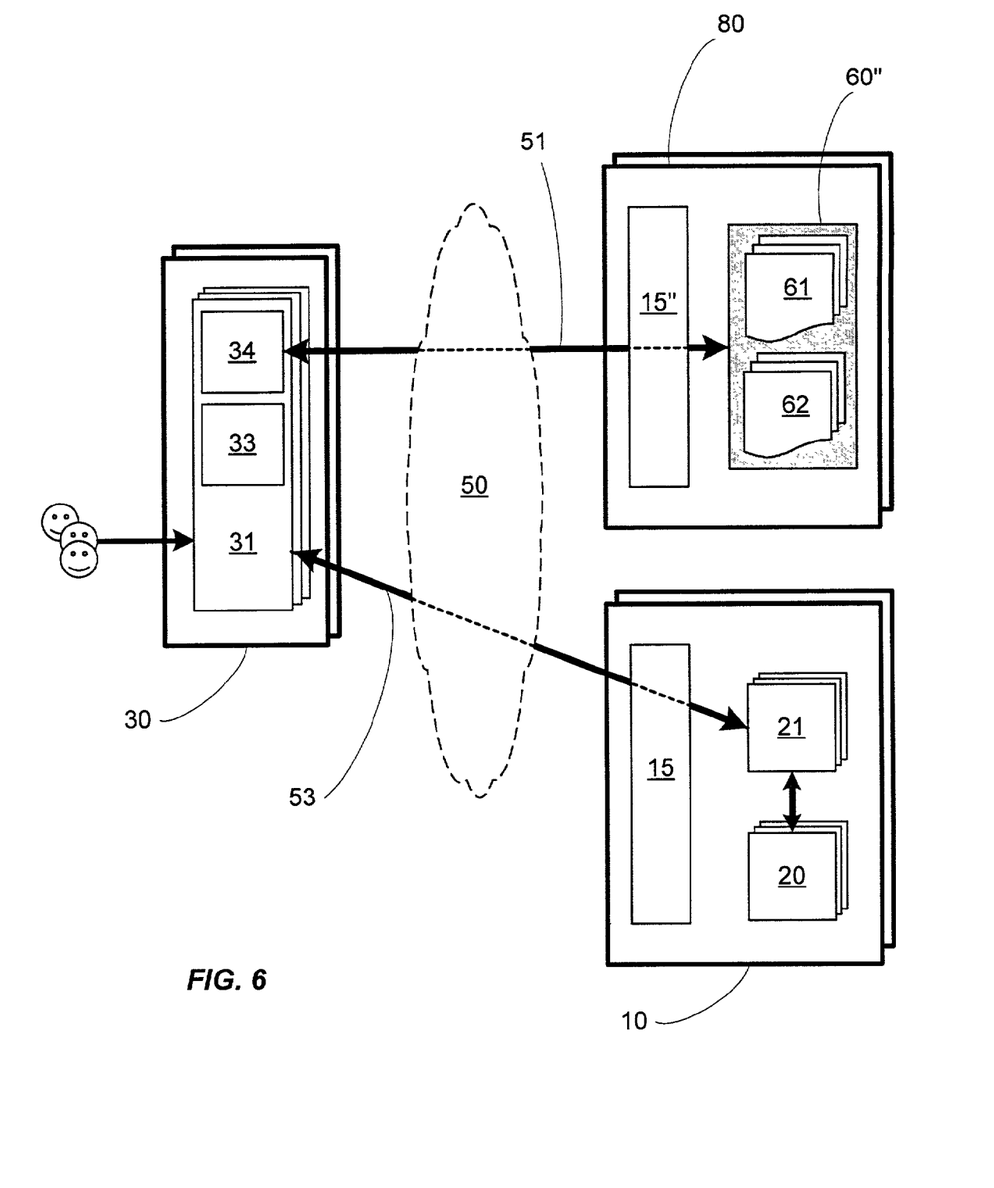
FIG. 6 is similar to FIG. 4 in which the service description document is memorized in a server.

FIG. 6 repeats the variant in FIG. 3 adapted to the example in FIG. 4 in which the automation equipment 10 installs a WEB service 21 but never a service description document 61. The service description document 61 is memorized in server 80.

Figure 7:
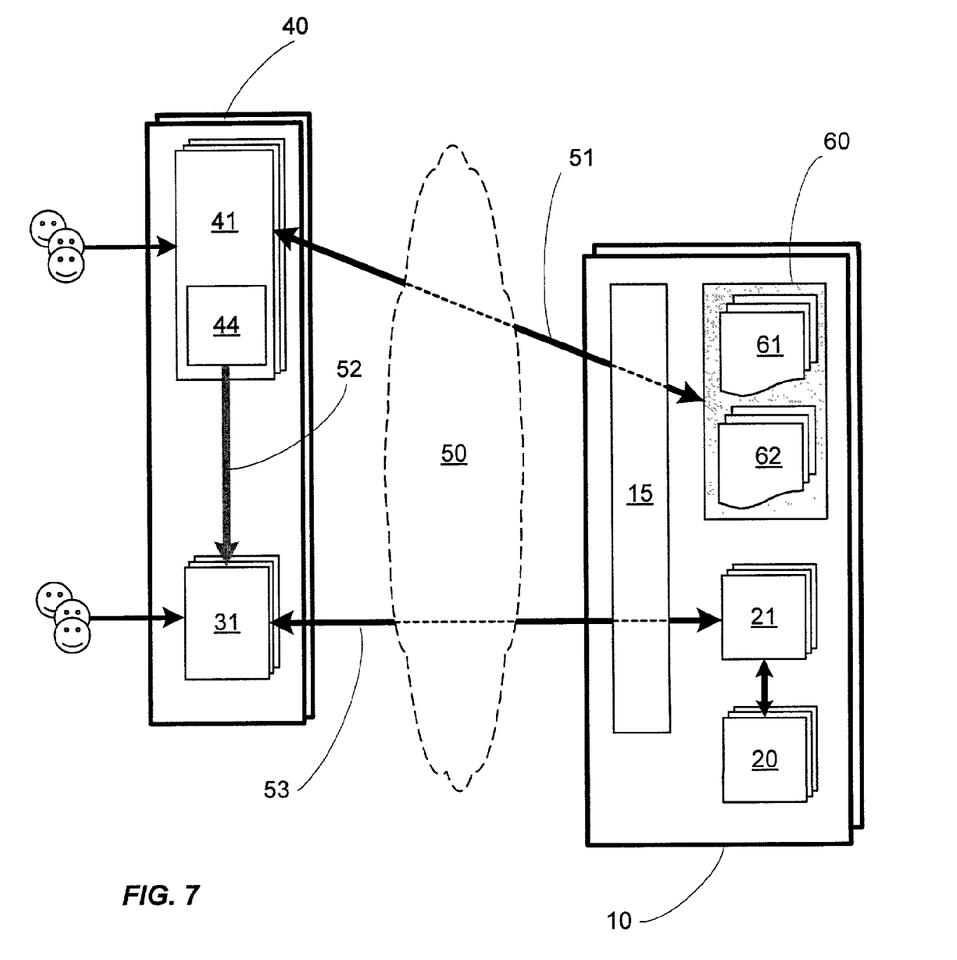
FIG. 7 shows a variant of the example in FIG. 1, in which all or some of a computer application is directly generated in remote equipment starting from a development application executed in the same remote equipment.

FIG. 7 shows a variant of the example shown in FIG. 1 in which the same remote equipment 40 comprises a development application 41 and a computer application 31. The development application 41 is then capable of generating and locally deploying all or some of the computer application 31 to enable it to communicate with WEB services 21 of automation equipment 10. In this example, the development application 41 comprises a code generator 44 specific to the automation equipment. In this case, in an equivalent manner, it would also be possible to envisage that the development application 41 is a tool intended for the development of automation application programs conform with standard IEC 1131-3.

According to another embodiment of the invention, a service description document 61 may be generated dynamically at the time that a computer application 31 or a development application 41 of a remote equipment 30, 40, sends a request 51 to access services available in automation equipment 10. This dynamic generation function makes it possible to avoid systematically memorizing a service description document 61 and to generate it simply on request and therefore to be able to modify it for each request, particularly when the configuration of the automation equipment 10 is modified (for example following the connection or disconnection of an I/O module in a programmable logic controller 10). Furthermore, automation equipment 10 may want to show or conceal some WEB services depending on its state or depending on the remote equipment 30, 40 that wants to communicate with it.

In doing this, the communication system comprises a service description document generator 62 that is a program capable of dynamically creating a service description document 61. Preferably, this dynamic construction is achieved due to a service description document generator 62 when remote equipment 30, 40 requests access to the service description document 61 of the automation equipment 10. In this case, the service description document 61 does not need to be memorised since it is generated dynamically following each request 51 sent by a computer application to the service description document generator 62. However, in some cases, it would also be possible to envisage a dynamic document construction 61 initiated at the request of the automation equipment 10. Furthermore, it would also be possible to envisage a combined solution in which the generator 62 would be capable of dynamically personalizing a service description document 61 based on a standard document already memorized for an equipment family, and then by adapting its standard document dynamically as a function of the state of the automation equipment 10.

Therefore in order to obtain a service description document 61, a read request 51 contains a URL, URI or IP address that points either directly to the service description document 61, or to a service description document generator 62 capable of dynamically creating the service description document 61. Therefore, in the same way as a service description document 61, a service description document generator 62 is accessible through a URL, URI or IP address through a network interface 15, 15', 15". It can then be memorized in storage means 60 of the automation equipment 10 (FIG. 4) in the storage means 60' of intermediate equipment 70 (FIG. 5), in the local storage means 60' of remote equipment 30, 40, or in remote storage means 60" of a server 80 (FIG. 6).

The following examples shows a service description document 61 called "Document1" conform with the WSDL language that describes the "Read" function with a "Read-Input" input named "Variable" and a "ReadOutput" output called "Result", a WEB service called "Service1" of automation equipment located at address: "example.com". The example simultaneously describes several WSDL bindings such as the SOAP, PROFInet, EtherNet/IP or MODBUS/TCP bindings, using the <soap:binding . . . >, <PROFInet: binding . . . >, <EtherNet:binding . . . >, <ModBusTCP: binding . . . >elements.

Example service description document conform with the WSDL language:

```
<?xml version="1.0">
    <definitions name="Document1"
targetNamespace="http://example.com/Document1.wsdl"
xmlns:tns="http://example.com/Document1.wsdl"
xmlns:xsd="http://www.w3.org/2000/10/XMLSchema"
xmlns:soap="http://schemas.xmlsoap.org/wsdl/soap/"
xmlns:PROFInet="http://schneider-electric.com/wsdl/PROFInet/"
xmlns:EtherNetIP="http://schneider-electric.com/wsdl/EtherNetIP/"
xmlns:ModBus TCP="http:
//schneider-electric.com/wsdl/ModBusTCP/"
xmlns:"http://schemas.xmlsoap.org/wsdl/">
<message name="ReadInput">
    <part name="Variable"type="xsd:string"/>
</message>
<message name="ReadOutput">
    <part name="Result"type="xsd:int"/>
</message>
<portType name="PortType1">
    <operation name="Read">
        <input message="tns:ReadInput"/>
        <output message="tns:ReadOutput"/>
    </operation>
</portType>
<binding name="SoapBinding" type="tns:PortType1">
    <soap:binding
style="rpc"transport="http://schemas/xmlsoap.org/soap/http"/>
    <operation name="Read">
        <soap:operation soapAction="http://example.com/Read"/>
        <input><soap:body use="encoded"
namespace="http://tempuri.org/message/"encodingStyle="http:
//schemas.xmlsoap.org/soap/encoding/"/>
        </input>
        <output><soap:body use="encoded"
namespace="http://tempuri.org/message/"
```

-continued

```
encodingStyle="http://schemas.xmlsoap.org/soap/encoding/"/>
        </output>
    </operation>
</binding>
<binding name="PROFInetBinding" type="tns:PortType1">
    <PROFInet:binding transport="http://scheider-
electric.com/PROFInet"/>
    <operation
name="Read"><input>...</input><output>...</output></operation>
</binding>
<binding name="EtherNetIPBinding" type="tns:PortType1">
    <EtherNetIP:binding transport="http://scheider-
electric.com/EtherNETIP"/>
    <operation
name="Read"><input>...</input><output>...</output></operation>
</binding>
<binding name="ModBus TCPBinding" type="tns:PortType1">
    <ModBus TCP:binding transport="http://scheider-
electric.com/ModBusTCP"/>
    <operation
name="Read"><input>...</input><output>...</output></operation>
</binding>
    <service name="Service1">
        <port name="SoapPort" binding="tns:SoapBinding">
            <soap:address location="http://example.com/"/>
        </port>
        <port name="PROFInetPort" binding="tns:PROFInetBinding">
            <PROFInet:address location="example.com"/>
        </port>
        <port name="EtherNetPort"binding="tns:EtherNetIPBinding">
            <EtherNetIP:address location="example.com"/>
        </port>
        <port name="ModBusTCPPort"binding=
"tns:ModBusTCPBinding">
            <ModBusTCP:address location="example.com"/>
        </port>
    </service>
</definitions>
```

Considering the upgradeable aspect of the WSDL language, it will be possible to add new elements to achieve upwards compatibility without destabilizing earlier developments. Furthermore, very different equipment unification will be achieved by storing and providing access for everyone to all service description documents describing services that they are capable of showing.

According to another embodiment of the invention, a service description document 61 related to an automation equipment 10 may be discovered with the assistance of a discovery document. A discovery document is a resource accessible on an IP network 50 through an IP network interface in order to recover URL, URI or IP addresses pointing to service description documents 61. A discovery document may refer to other associated discovery documents if necessary.

A discovery document may be in the form of one or several WEB pages conform with WEB page description languages such as Hyper Text Markup Language (HTML), Wireless Markup language (WML) or XML Hyper Text Markup Language (XHTML) proposing one or several lists of URL, URI or IP addresses classified according to different criteria and pointing to one or several service description documents 61.

The format of a discovery document for a service description document 61 is preferably conform with standard specifications and particularly Advertisement and Discovery Services (ADS) defined by IBM Corporation, Discovery (DISCO) defined by Microsoft Corporation, or Universal Description, Discovery and Integration (UDDI), published on the http://www.uddi.org. site.

A discovery document for a service description document 61 related to automation equipment 10 is memorized either in storage means 60 located in the automation equipment 10, or in storage means 60' located in intermediate equipment 70 connected to the automation equipment 10 and to at least one remote equipment 30, or memorized in storage means 60" located in a server 80.

The invention also relates to a communication process used in a communication system like that described above. This process comprises the following steps:

A first step for the discovery of one or several WEB services 21, 21' in which a computer application 31 or a development application 41 executing in remote equipment 30, 40, send a request 51 on the IP network 50 to receive one or more service description documents 61 conform with the WSDL language and describing the capabilities of one or several WEB services 21, 21', in a reply 51. The request 51 contains at least one URL, URI or IP address that points to a service description document 61 already memorized in the automation equipment 10, in intermediate equipment 70, or in a server 80. The request 51 may also point directly to local storage means of remote equipment 30, 40. The request 51 may also point to a service description document generator 62 that then dynamically builds a service description document 61 to return it in the response 51.

A second generation step in which a service description document 61 conform with the WSDL language is used to automatically or manually generate 52 all or some of a computer application 31 (using code generators 43, 44) or to generate a behaviour in a computer application 31 (by means of WSDL document interpreters 33, 34) such that the computer application 31 on the remote equipment 30 communicates with a WEB service 21, 21' by means of messages 53 conform with the communication protocol described in the service description document 61.

A third communication step between a computer application 31 executed on remote equipment 30 and a WEB service 21, 21' on automation equipment 10 on the IP network 50 using messages 53 conform with the communication protocol described in the service description document 61.

During the generation step, a second remote equipment 40 executing a development application 41 can generate all or part of a computer application 31 either locally in the same second remote equipment 40 or remotely on the IP network 50 to a first remote equipment 30. Thus, the computer application 31 and the development application 41 may be on the same remote equipment 40 as shown in FIG. 7, or on two separate remote pieces of equipment communicating through the IP network 50 as shown in FIG. 1.

During the discovery step, a computer application 31 (the same as the development application 41) may use one or several discovery documents to search for one or several service description documents 61 with the assistance of at least one URL, URI or IP address describing a WEB service 21, 21' related to automation equipment 10.

Obviously, it would be possible to imagine other variants and improvements to detail and even to consider the use of equivalent means, without going outside the scope of the invention.

The invention claimed is:

1. A communication system including:
   automation equipment having at least one processing unit configured to execute at least one automation program and at least one web service, said automation equipment including a building automation logic controller for a building, said automation program configured to provide an automation function, said web service configured to provide a remote access to the automation function and said automation function including a building automation function for the building;
   remote equipment configured to communicate with the automation equipment over an IP network;
   a computer application configured to execute on the remote equipment and to communicate with the at least one web service to provide a remote automation function to the remote equipment, said remote automation function including at least one of monitoring, display, control, configuration, and programming of the automation function provided by the automation program on the automation equipment using the remote access of the web service; and
   said remote automation function being based on at least one service description document configured to describe capabilities of the at least one web service using a WSDL (Web Services Description Language) language.

2. The communication system of claim 1, wherein the service description document is accessible to remote equipment through a URL, URI or IP address through an IP network interface.

3. The communication system of claim 2, wherein the at least one web service is configured to receive and send messages encoded according to at least one communication protocol that conforms to at least one WSDL binding described in the at least one service description document on the IP network.

4. The communication system of claim 3, wherein the at least one WSDL binding described in the at least one service description document conforms to at least one of SOAP, HTTP and MIME protocol.

5. The communication system of claim 4, wherein the at least one service description document includes a description of a capacity of the at least one web service according to at least one communication protocol of the automation equipment.

6. The communication system of claim 4, wherein the at least one web service is configured to receive and send requests encoded according to at least one protocol of the automation equipment.

7. The communication system of claim 3, wherein the at least one WSDL binding described in the at least one service description document conforms to at least one communication protocol of the automation equipment.

8. The communication system of claim 3, wherein the at least one WSDL binding described in the at least one service description document conforms to at least one version of the SOAP protocol encoded in a binary format.

9. The communication system of claim 3, wherein the at least one web service is configured to interact with the automation program in the automation equipment and is installed in the automation equipment.

10. The communication system of claim 3, further comprising intermediate equipment operatively connected to the automation equipment and the remote equipment, said intermediate equipment including at least one web service configured to interact with the automation program in the automation equipment.

11. The communication system of claim 2, wherein the automation equipment further comprises an automation equipment local storage configured to memorize the at least one service description document.

12. The communication system of claim 2, further comprising intermediate equipment operatively connected to the automation equipment and the remote equipment, said intermediate equipment including an intermediate local storage configured to memorize the at least one service description document.

13. The communication system of claim 2, further comprising a server operatively connected to the IP network and including a server local storage configured to memorize the at least one service description document.

14. The communication system of claim 2, further comprising a service description document generator configured to dynamically build the at least one service description document based on a request from the remote equipment and accessible to the remote equipment through an URL, URI or IP address through the IP network interface.

15. The communication system of claim 2, wherein the remote equipment is configured to access a discovery document for the at least one service description document through an URL, URI or IP address.

16. The communication system of claim 15, wherein the discovery document for the service description document is represented by at least one web page that conforms to at least one web page description language, and the discovery document includes at least one list of URL, URI or IP addresses for the at least one service description document.

17. The communication system of claim 15, wherein a format of the discovery document of the at least one service description document conforms to at least one of ADS (Advertisement and Discovery Services), DISCO (Discovery), and UDDI (Universal Description, Discovery and Integration) specifications.

18. The communication system of claim 15, wherein the automation equipment further comprises a storage device configured to memorize the discovery document for the at least one service description document.

19. The communication system of claim 15, further comprising intermediate equipment operatively connected to the automation equipment and the remote equipment and comprising a storage device configured to memorize the discovery document for the at least one service description document.

20. The communication system of claim 15, further comprising a server operatively connected to the IP network and comprising a storage device configured to memorize the discovery document for the at least one service description document.

21. The communication system of claim 1, wherein the remote equipment further comprises a remote local storage configured to memorize the at least one service description document.

22. The communication system of claim 1, wherein the automation equipment includes at least one of a programmable logic controller, a numeric controller, an instrumentation station, and a control station.

23. The communication system of claim 1, wherein the automation function includes at least one of an industrial control function, a building automation equipment function, an instrumentation for electrical distribution networks function, and a control for electrical distribution networks function.

24. A method of communicating in a communication system, said method comprising steps of:
executing at least one automation program and at least one web service in an automation equipment having at least one processing unit, said automation equipment including a building automation logic controller for a building;
providing an automation function from the automation program, said automation function including a building automation function for the building;
providing remote access to the automation function from the web service;
communicating with the automation equipment over an IP network from a remote equipment;
executing a computer application on the remote equipment;
communicating with the at least one web service from the computer application on the remote equipment to provide a remote automation function to the remote equipment, the remote automation function including at least one of monitoring, display, control, configuration, and programming of the automation function provided by the automation program on the automation equipment using the remote access of the web service; and
describing capabilities of the at least one web service using a WSDL (Web Services Description Language) language in the at least one service description document, and basing the remote automation function on the at least one service description document.

25. The method of claim 24, further comprising steps of:
sending a request on the IP network from at least one of the computer application and a development application executing on the remote equipment to receive the at least one service description document;
generating at least a part of the computer application based on the at least one service description document using a code generator; and
transmitting messages between the computer application and the at least one web service according to a capability of the at least one web service described in the at least one service description document.

26. The method of claim 25, wherein the sending a request further comprises using at least one discovery documents to receive the at least one service description document.

27. The method of claim 25, wherein the generating further comprises generating at least part of the computer application using a code generator executing on at least one of the remote equipment and a second remote equipment operatively connected to the automation equipment and the remote equipment by the IP network.

28. The method of claim 24, wherein the automation equipment includes at least one of a programmable logic controller, a numeric controller, an instrumentation station, and a control station.

29. The method of claim 24, wherein the automation function includes at least one of an industrial control function, a building automation equipment function, an instrumentation for electrical distribution networks function, and a control for electrical distribution networks function.

30. A communication system including:
automation equipment having at least one processing unit configured to execute at least one automation program and at least one web service, said automation equipment including an industrial automation logic controller for industrial equipment, said automation program configured to provide an automation function, said web service configured to provide a remote access to the automation function and said automation function including an industrial equipment automation function for the industrial equipment;
remote equipment configured to communicate with the automation equipment over an IP network;
a computer application configured to execute on the remote equipment and to communicate with the at least one web service to provide a remote automation function to the remote equipment, said remote automation function including at least one of monitoring, display, control, configuration, and programming of the automation function provided by the automation program on the automation equipment using the remote access of the web service; and said remote automation function being based on at least one service description document configured to describe capabilities of the at least one web service using a WSDL (Web Services Description Language) language.

31. A method of communicating in a communication system, said method comprising steps of:

executing at least one automation program and at least one web service in an automation equipment having at least one processing unit, said automation equipment including an industrial automation logic controller for industrial equipment;

providing an automation function from the automation program, said automation function including an industrial equipment automation function for the industrial equipment;

providing remote access to the automation function from the web service;

communicating with the automation equipment over an IP network from a remote equipment;

executing a computer application on the remote equipment;

communicating with the at least one web service from the computer application on the remote equipment to provide a remote automation function to the remote equipment, the remote automation function including at least one of monitoring, display, control, configuration, and programming of the automation function provided by the automation program on the automation equipment using the remote access of the web service; and describing capabilities of the at least one web service using a WSDL (Web Services Description Language) language in the at least one service description document, and basing the remote automation function on the at least one service description document.

* * * * *